United States Patent [19]

Dittakavi

[11] Patent Number: 4,549,867

[45] Date of Patent: Oct. 29, 1985

[54] ELECTRONIC LEARNING AID WITH RANDOM NUMBER MODES

[75] Inventor: Ashok Dittakavi, Lubbock, Tex.

[73] Assignee: Texas Instruments Incorporated, Dallas, Tex.

[21] Appl. No.: 382,008

[22] Filed: May 25, 1982

[51] Int. Cl.⁴ .............................................. G09B 17/00
[52] U.S. Cl. .................................. 434/337; 434/201; 434/169; 381/52; 84/470 R; 273/138 A
[58] Field of Search .................. 434/335, 338–341, 434/205, 319–321, 156, 157, 169, 176, 201; 273/1 E, 138 A; 179/1 SM, 1 SF; 84/470 R, 477 R, 478 R; 381/52

[56] References Cited

U.S. PATENT DOCUMENTS

| | | | |
|---|---|---|---|
| 4,089,124 | 5/1978 | Burtis et al. | 434/201 |
| 4,095,791 | 6/1978 | Smith et al. | 273/DIG. 28 |
| 4,160,399 | 7/1979 | Deutsch | 84/470 R |
| 4,189,779 | 2/1980 | Brautingham | 273/237 |
| 4,207,087 | 6/1980 | Morrison et al. | 273/1 E |
| 4,228,716 | 10/1980 | Linford | 84/1.18 |
| 4,261,241 | 4/1981 | Gould et al. | 84/483 A |
| 4,336,935 | 6/1982 | Goldfarb | 273/1 E |
| 4,337,375 | 6/1982 | Freeman | 434/313 |
| 4,359,220 | 11/1982 | Morrison et al. | 273/1 E |
| 4,364,299 | 12/1982 | Nakada et al. | 84/477 R |

Primary Examiner—Richard C. Pinkham
Assistant Examiner—Leo P. Picard
Attorney, Agent, or Firm—Robert D. Marshall, Jr.; N. Rhys Merrett; Melvin Sharp

[57] ABSTRACT

The present invention is an electronic learning aid which employs a scanning device for reading printed coded indicia which includes random number modes. A first random number mode provides a flat distribution random number in accordance to a range command. This mode is actuated by scanning coded indicia, firstly, a random number generation command and secondly, a range command. The apparatus then generates a random number from a set of numbers, this set of numbers being determined by the range command. This random number is then employed to select a response which is provided to the user by a speech synthesizer speaking one or more words of human language. In a second embodiment, the random number command enables generation of a random number from among a set in which the probability of selecting one member of the set is different from the probability of selecting other members of the set. This mode could be employed to simulate the number of spots turned upon tossing of two or more dice. As in the first embodiment, the result is communicated to the user via one or more words of human language spoken by a speech synthesizer.

7 Claims, 7 Drawing Figures

ELECTRONIC LEARNING AID WITH RANDOM NUMBER MODES

BACKGROUND OF THE INVENTION

This invention relates to electronic educational products and more specifically to speaking electronic educational products.

In recent years there have become available a number of electronic educational learning aid products, an early example of these being the Little Professor mathematics learning aid. This product presents mathematical problems to an operator by means of a visual display and the operator enters attempted solutions to the problem via a keyboard. The product then indicates to the operator the correctness of his response. In addition there has appeared a series of learning aids which have the additional capability of communicating to the operator by means of electronically synthesized speech. Examples of these include the Speak and Spell, Speak and Math, and Speak and Read electronic learning aids (each of the previously enumerated product names is a trademark of Texas Instruments Incorporated).

More recently there has been disclosed in Freeman U.S. Pat. No. 4,337,375, entitled "Manually Controllable Data Reading Apparatus for Speech Synthesizers", issued June 29, 1982, a new type of system which has the capability of communicating to the operator by means of electronically synthesized speech. This system is distinguished by the fact that the words that are to be spoken are identified to the system by the operator through the use of an optical code reading instrument. The code, which may comprise a bar code of the type that has been used by grocers on certain of their products, may typically appear on the pages of a book below a line of corresponding printed text. Thus, an operator, who may typically be a child seeking to gain reading facility, when he encounters words or phrases that he does not recognize, may pass the optical reading instrument over the corresponding coded material thereby causing the system to speak the word or phrase. It will be seen therefore that such a system comprises a powerful learning aid in that it will selectively provide for the student verbalization of those words and phrases which he does not recognize in the printed text. It will be appreciated that a learning aid with such capability may have application to students of a wide variety of ages including preschool students.

A problem, particularly with students of younger ages, is to provide systems which will not only be effective in imparting the educational content, but which will also provide an enjoyable experience so as to maintain the interest of the student. In accordance with the various embodiments of this invention, there is provided a code reading speaking learning aid of the type described above, which has a plurality of modes of operation so as to provide the student with variety and stimulation in the educational experience.

In a first mode of operation an operator passes the optical reader over a sequence of bar codes to identify to the learning aid the specific sounds to be reproduced. These individual sound identifications are then stored in a queue memory until the memory is full or the operator requests playback. At that time the sequence of sounds entered by the operator is reproduced by the synthesizer of the learning aid.

A second mode of operation is approximately the converse of that just described. In this case the operator initiates the action by wanding a specific bar code to indicate to the learning aid that the "random sequence" mode of operation is to be provided. Here the learning aid selects and produces an audible random sequence of sounds. The operator then seeks to duplicate this sequence of sounds by passing the optical reader over individual bar codes each corresponding to a sound which may be a member of the sequence. In the event of an erroneous entry, the learning aid advises the student to try again and when the correct sequence has been ultimately entered, the learning aid compliments the student. Finally, in a random number mode of operation, which is initiated when the operator passes the optical reader over a specific bar code, the learning aid audibly expresses a number which has been selected at random from an identified distribution. The specific distribution, as indicated by the bar code in a specific case, may be flat within a given range so that all members of the distribution have an equal probability of being selected. Alternatively, the distribution may be that corresponding to the total sum in the roll of two or more dice. As is well known, in the roll of two dice, for example, the probability that the sum will be seven is much larger than the probability that the sum will be two.

It is therefore an object of the invention to provide a speaking electronic learning aid which provides both interesting and effective educational experiences to an operator.

It is a further object of the invention to provide a speaking electronic learning aid which enables an operator to identify a sequence of sounds which is then reproduced by the learning aid.

It is a further object of the invention to provide a speaking electronic learning aid wherein the aid produces a sequence of sounds which the operator then seeks to duplicate.

It is yet another object of the invention to provide in a speaking electronic learning aid, means for generating a random number at the direction of an operator.

The novel features believed characteristic of the invention are set forth in the appended claims. The invention itself, however, as well as other features and advantages thereof will be best understood by reference to the detailed description which follows, read in conjunction with the accompanying drawings, wherein:

DETAILED DESCRIPTION

Figure 1:
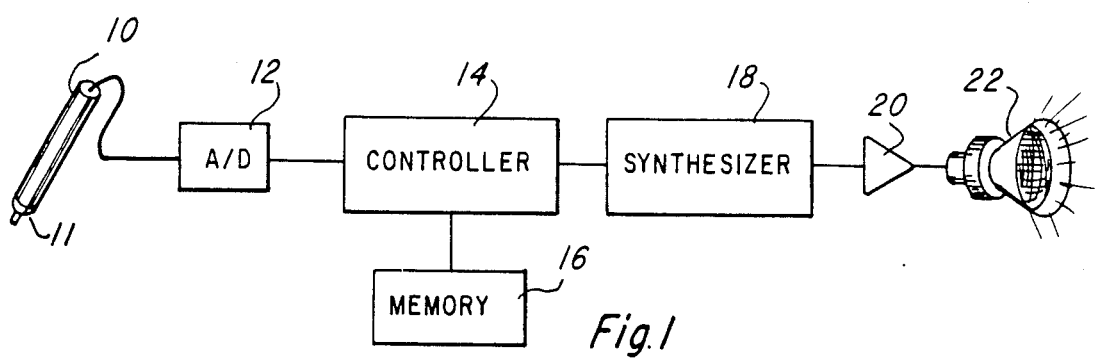
FIG. 1 is a block diagram of the electronic learning aid of the invention.

With reference to FIG. 1 there is shown a block diagram of the claimed system. The input to the system comprises an electro-optical wand 10 which is used to scan and detect bar code located on the medium to be read. Illumination of the bar code, typically by means of infra-red energy, and sensing of the energy reflected from the bar code is accomplished by means of a head 11. Such electro-optical wands are well known in the art and typically comprise means for generating the illuminating energy, as well as means for detecting and converting the reflections from the bar code to electrical energy. A particularly convenient mechanism for transmitting the illuminating energy and the reflected energy is that disclosed in copending U.S. Patent application Ser. No. 308,346, filed 10/5/81 and assigned to the assignee of the present invention. In the preferred embodiment of the invention the bar code to be read by the wand will have one or two colors, black or white, although in other embodiments it may be preferrable to use multicolor bar code. In the case of two color bar code the electrical signal output by wand 10 is analog in nature, but basically has two discrete levels corresponding to the two colors comprising the bar code.

The output of the scanning wand 10 is digitized in analog to digital converter 12. Functionally, A/D converter 12 amounts to an overdriven amplifier which serves to square up the analog waveform from wand 10 so that the output of A/D converter 12 is a well defined digital signal having one of two discrete levels.

The output of A/D converter 12 is coupled to an input of controller 14, which in the preferred embodiment comprises a model TMS 7040 8-bit microcomputer available from Texas Instruments Incorporated. Controller 14 utilizes information derived from the bar code by wand 10 to control the operation of the system as claimed.

To accomplish spoken or other auditory communication to the user of the system, controller 14 in the preferred embodiment provides digital auditory information to synthesizer 18 which may comprise a model TMS 5220A voice synthesis processor also available from Texas Instruments Incorporated. Synthesizer 18 utilizes the digital input information to synthesize an analog sound waveform which is in turn provided to amplifier 20. Amplifier 20 in turn provides the analog signal at a suitable level to speaker 22 for generation of the audible information.

In the preferred embodiment, at least some of the digital data used by synthesizer 18 is stored in the form of allophones. As is well known by those skilled in the art, allophones are basic units of speech which may be combined in suitable sequences so as to provide the sounds, words, phrases and the like that are useful in human communication. The digital data which is used by synthesizer 18 to synthesize the individual allophone sounds are stored in memory 16 which in the preferred embodiment comprises a read only memory (ROM).

Figure 2:
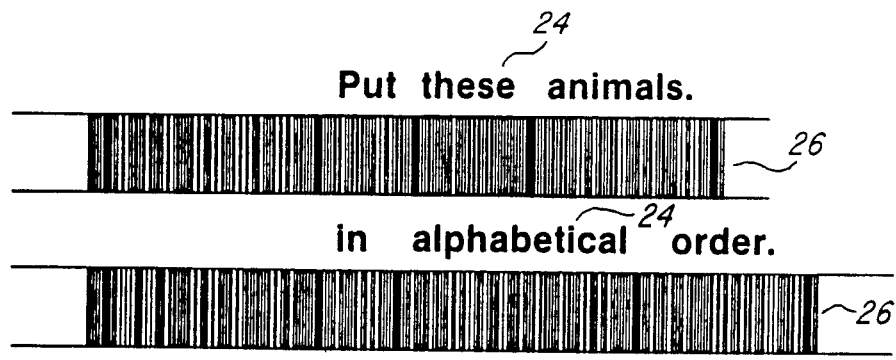
FIG. 2 is an illustration of typical alphanumeric and bar code data which appears in books utilized in conjunction with the apparatus of the present invention.

Various types of information are available from the bar code located on the printed medium such as a page of a book. An example of a portion of such a page is illustrated in FIG. 2. When the wand is passed over the bar code 26 the system will enunciate the phrase comprised of the words 24. The portion of the bar code underlying each of these individual words serves to identify the sequence of allophones that is required in each case to produce the corresponding word. It will be noted however that the two lines of bar code illustrated each has a considerable portion to the left of the area in which the words of the phrase appear. This additional bar code serves in part to provide prosody information for the corresponding phrase. Such prosody information serves to indicate a desired pitch variation and duration for the individual allophones. In the absence of such prosody information the sequence of allophones when assembled would result in relatively monotonic speech. With the use of the prosody information, the speech is produced in a more familiar and pleasing fashion.

Further, the bar code located to the left of the region where the words appear also provides information about the nature of the activity. The system illustrated in FIG. 1 has various modes of operation, each of which is initiated by information derived from the pages of the book itself. This mode information which is derived from the left portions of the bar code 26 illustrated in FIG. 2 is utilized by controller 14 to direct appropriate functioning of the system. Thus in the example of FIG. 2, when the operator passes the wand over the bar code the system utilizes the prosody and allophone identification data in the bar code to access the digital information for the appropriate allophones from ROM 16, and to modify this data in accordance with the prosody information before passing the digital signals to synthesizer 18 for sound synthesis. In addition the bar code has informed controller 14 to place itself in a mode wherein the operator is required to identify a plurality of characters in an alphabetical order. As will be subsequently described, other modes of operation are possible.

The acquisition of prosody and allophone identification from scanned bar code is disclosed in U.S. patent application Ser. Nos. 381,986 and 381,987 filed the same date as the present application, also assigned to the assignee of the present invention.

Figure 3:
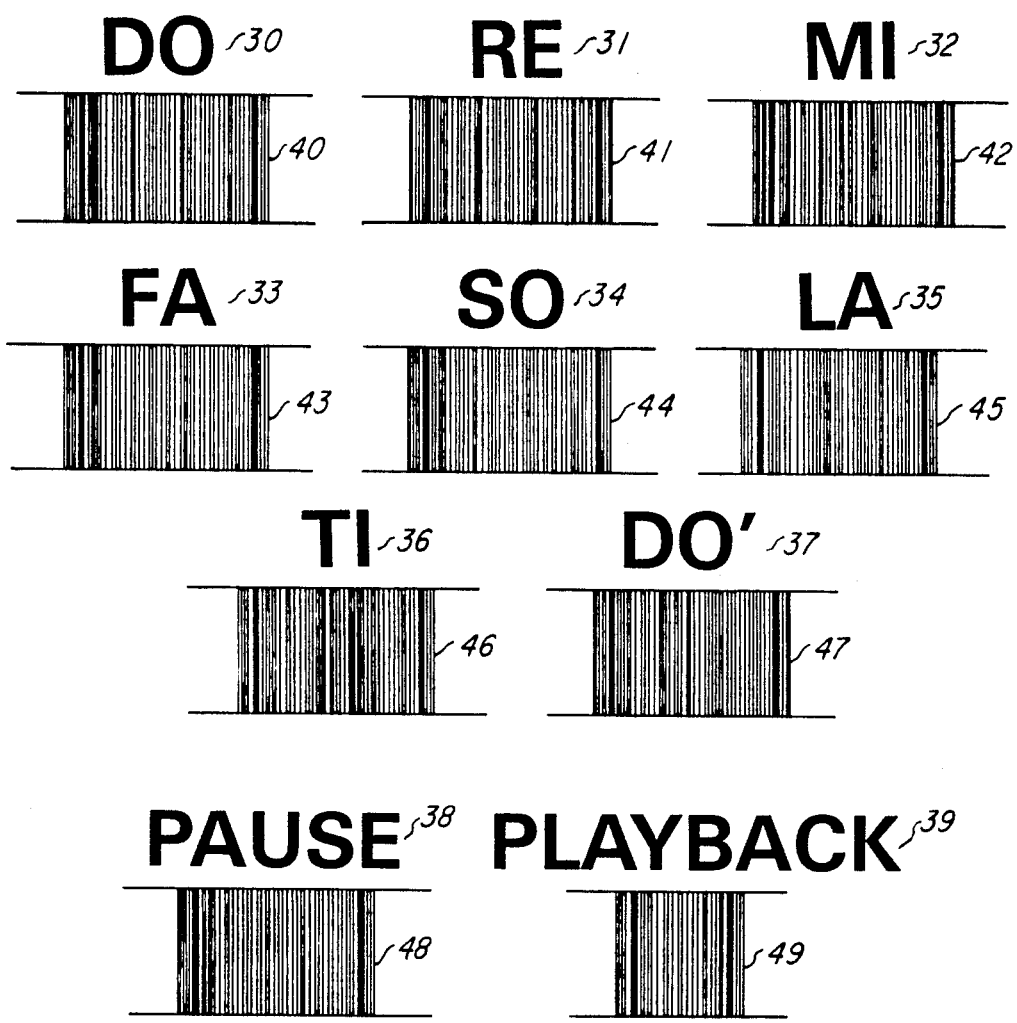
FIG. 3 is an example of a page of a book which may be used in the link/access mode of the invention.

With reference to FIG. 3 there is illustrated a page containing various alphanumeric characters and the associated bar codes that may be utilized in the link/access mode of the invention. Shown at 30–37, for example, are alphanumeric characters respresenting the sounds of the musical scale. Also shown at 40–47 are the corresponding bar codes. Each of these bar codes, as well as indicating the identity of the sound to be reproduced, also includes information indicating that the link/access mode of the invention is to be implemented. Of course, sounds other than those of the musical scale could be substituted. The functions of the words pause 38 and playback 39 along with their associated bar codes 48 and 49 will be described below.

Figure 4:
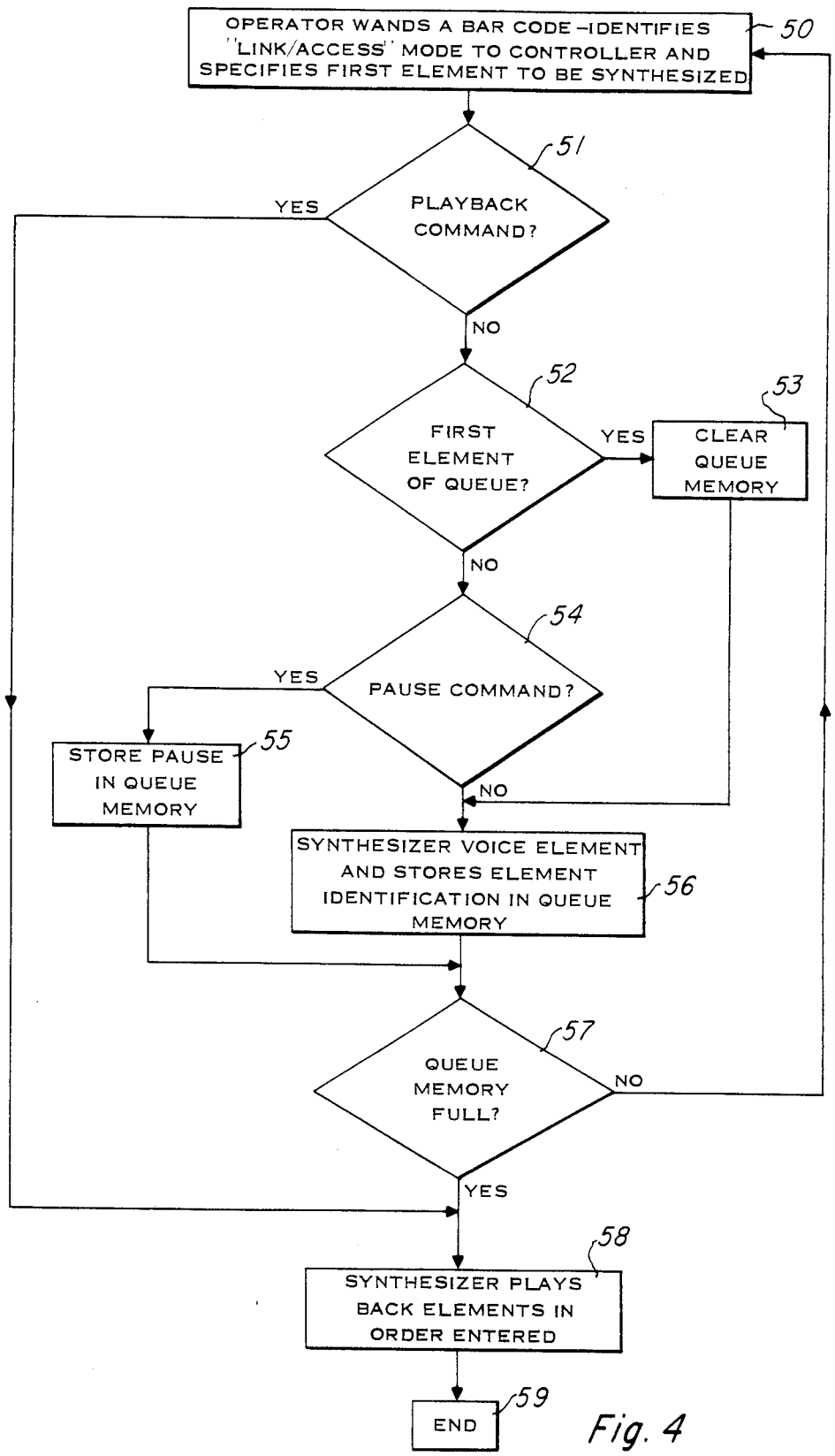
FIG. 4 is a flow diagram illustrating the means provided by the apparatus for the link/access mode of the invention.

Now turning to FIG. 4 for the implementation of the link/access mode of the invention, it will be seen that this mode is entered at block 50 when the operator wands any of bar codes 40 through 47 of FIG. 3. This bar code identifies to controller 14 the fact that the link/access mode is to be implemented and also the identity of the first element to be synthesized. At 51 controller 14 tests to determine whether a playback command has been entered. Such entry can be accomplished by wanding the bar code 49 associated with the word playback of FIG. 3. When the playback command is entered, as illustrated at block 58, the synthesizer plays back the sequence of elements that have been entered prior to the entry of the playback command. However, if test 51 determines that a playback command has not been entered as would be the case when the first element of the sequence has been entered, then flow passes to test 52 where the controller determines whether what has been entered is the first element of the queue. If such is the case then at block 53 the queue memory is cleared and flow passes to block 56 so that the synthesizer then voices the entered element and stores the corresponding element identification in the queue memory.

Alternatively, if test 52 determines that what has been entered is not the first element of the queue, then at block 54 controller 14 tests to determine if a pause command has been entered. Such entry would be accomplished by wanding bar code 48 corresponding to the word pause as shown in FIG. 3. The function of the pause command is to cause the storage of a pause in the queue memory. In this way the operator is able to insert quite periods in the sequence of sound which he seeks to enter into the learning aid. If a pause command has been entered then at block 54 this pause is stored in the queue memory. Alternatively, if what has been entered is not a pause command flow passes to block 56 where again the synthesizer voices the entered element and stores the corresponding element identification in the queue memory. Next at test 57, the controller determines whether or not the queue memory is full. If it is determined that the queue memory is full then at block 58 of the synthesizer plays back the elements from the queue memory in the order in which they have been entered. If the queue memory is found not to be full at test 57 then flow loops back to block 50 where another bar code can be entered. It will be seen, therefore, that the apparatus provides means whereby an operator may identify a sequence of sounds including pauses to the learning aid and have this sequence played back to him in audible form. The length of the sequence is limited only by the available size of the queue memory. The contents of the queue memory may be played back at anytime by simply wanding the playback bar code and as many times as desired by repeated wandings of the playback bar code.

Figure 5:
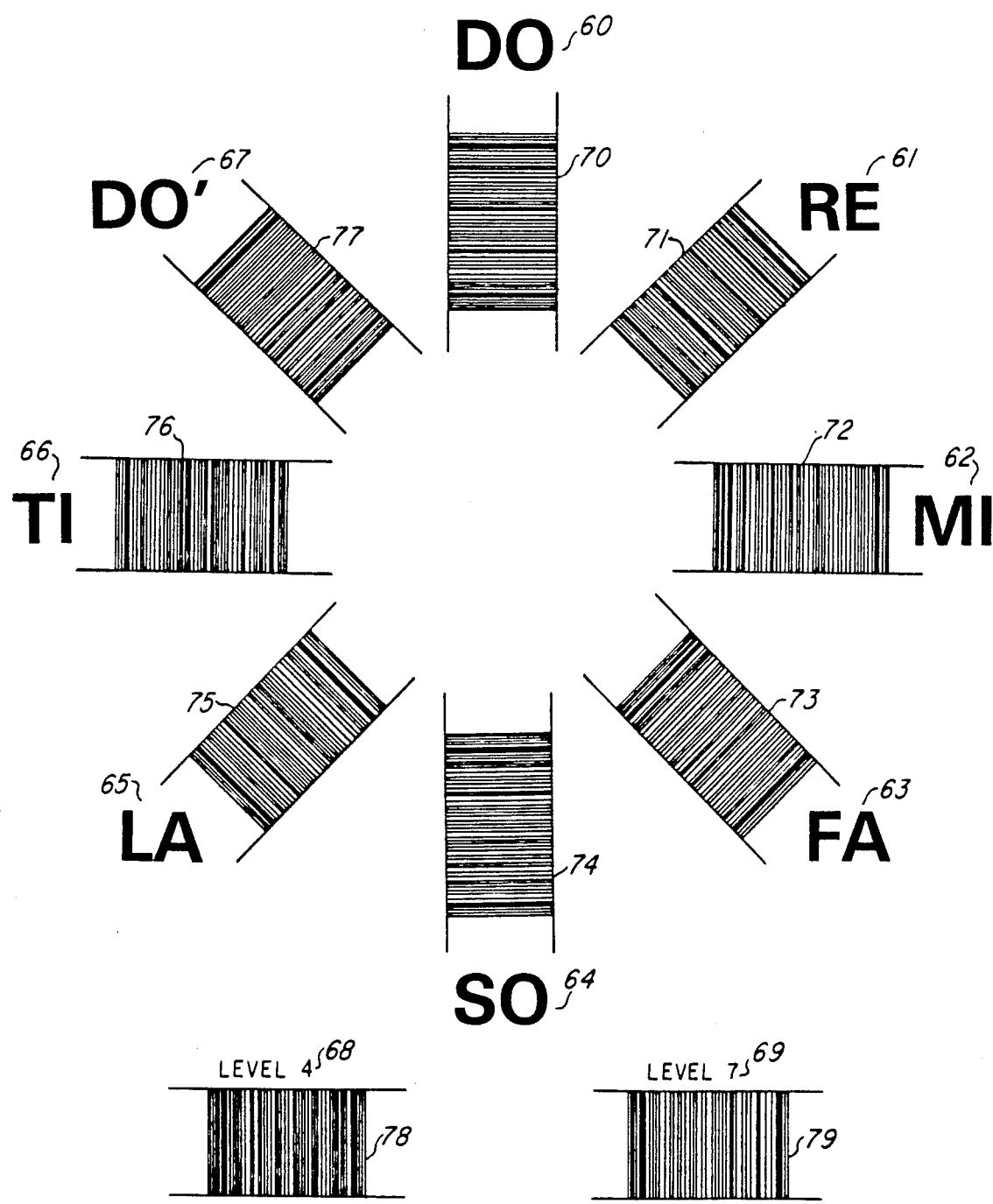
FIG. 5 is an illustration of a page of a book which may be utilized in the random sequence mode of the invention.
Figure 6:
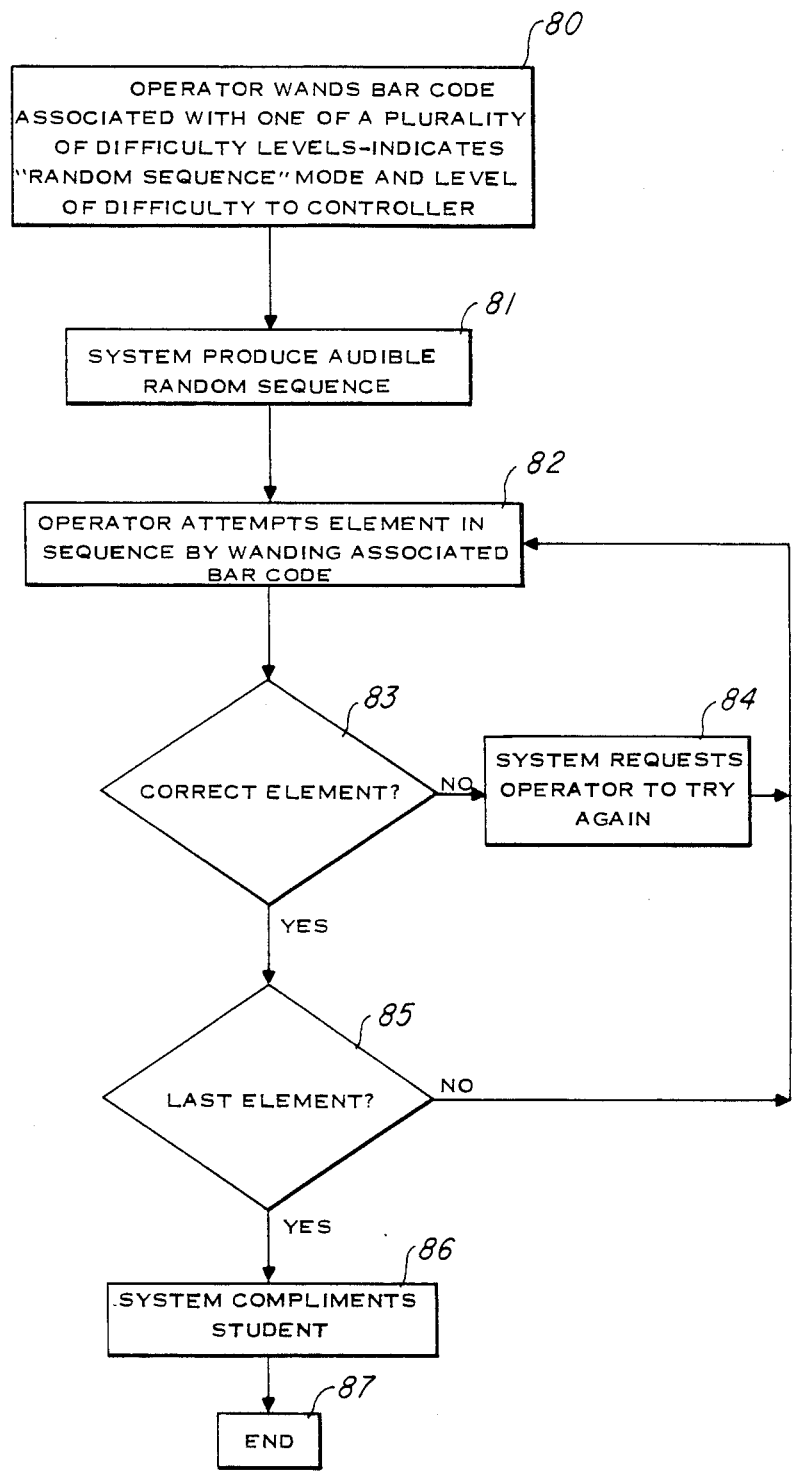
FIG. 6 is a flow diagram illustrating the means provided by the apparatus to implement the random sequence mode of the invention.

Turning next to FIGS. 5 and 6, there is a discussion of the random sequence mode sequence mode of the invention. The random book page in this case is seen to include a plurality of alphanumeric characters 60-67 representing sounds. Associated with these characters are the bar codes 70-77. Also there are bar codes 78 and 79 corresponding to different levels of difficulty 68 and 69.

The operator enters this mode of operation by wanding the bar code associated with one of the difficulty levels. This indicates to the controller the fact that the random sequence mode is to be implemented and the particular level of difficulty to be utilized as is illustrated at block 80 of FIG. 6. In response to this at block 81 the learning aid selects a specific sequence of the sounds illustrated in FIG. 5 and produces an audible rendition of this sequence. At block 82 then the operator seeks to reproduce the sounds of this random sequence. He does so by selecting the sequence, element by element, in each case by wanding the bar code corresponding to his choice. The controller at test 83 determines whether the operator has selected the correct element for the present point in the sequence. If the operator's choice is incorrect then at block 84 the system requests the operator to try again and flow returns to block 82 where the operator selects another element. Alternatively, if the correct element has been chosen flow passes to test 85 where controller 14 determines whether the operator has input the last element of the sequence. If such is not the case then flow returns to block 82 where the operator selects the next element. Alternatively, if the last element has been properly selected then at block 86 the system compliments the student and flow passes to the end block 87 where the system enters a wait state.

Among the various ways in which the levels of difficulty can be varied are the following. First in FIG. 5 it will be noted that the range of the sequence is eight, that is there are eight distinct sounds which may be used to make up the sequence. Clearly as the range of the sequence increases so that more sounds are available, the difficulty of reproducing the sequence increases. Alternatively, the level of difficulty may be varied by varying the number of elements that must be reproduced to complete a sequence. This number of elements is communicated to the learning aid by bar codes 78 or 79. Also as a matter of design choice, bar codes 78 and 79 may indicate to the learning aid that a subset of less than all the eight elements illustrated in FIG. 5 are to be utilized. It will be seen, therefore, that this mode provides a convenient means of producing a sequence of sounds to an operator and permitting the operator to seek to reproduce the same sequence.

Figure 7:
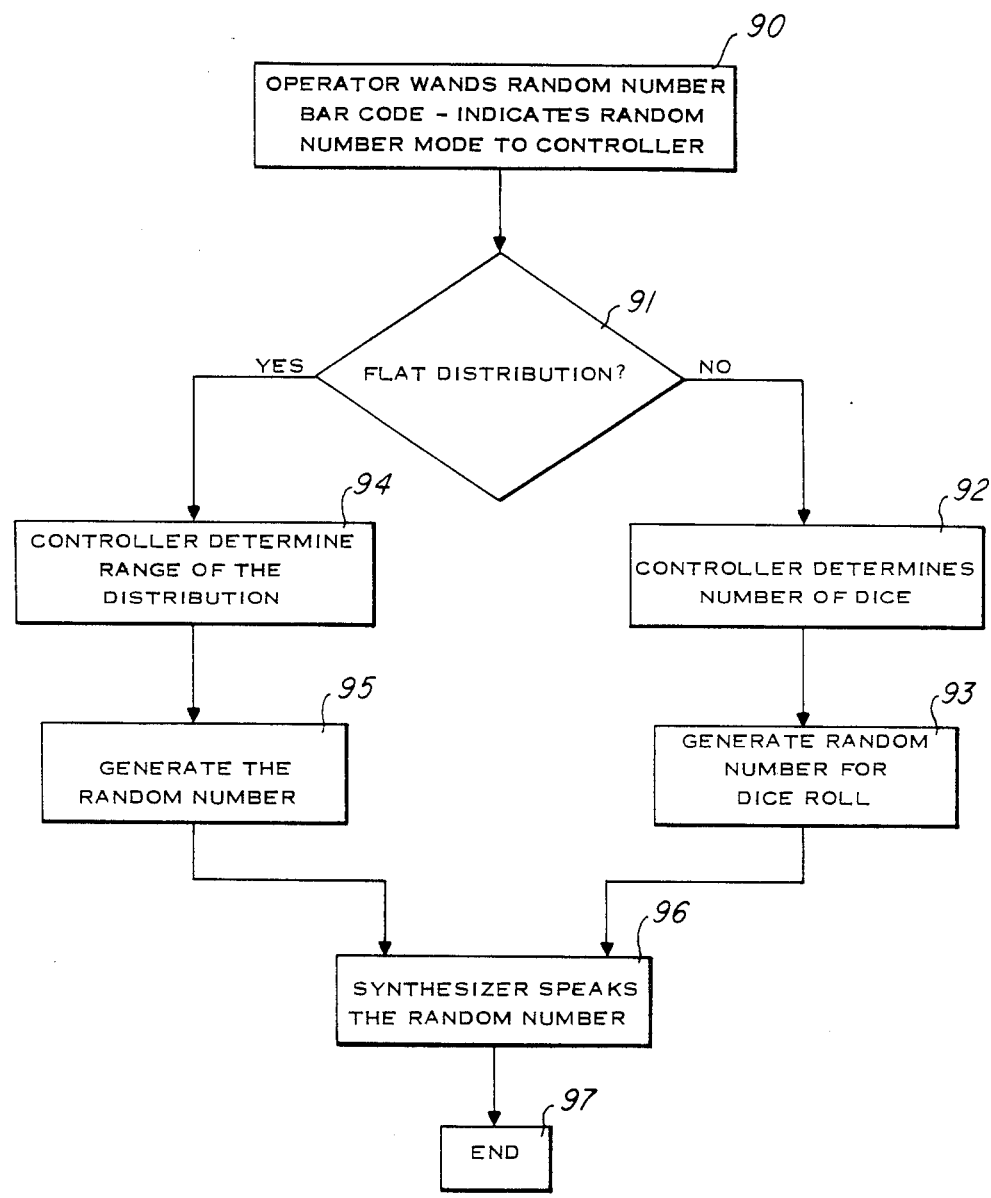
FIG. 7 is a flow diagram illustrating the means provided by the apparatus to implement the random number mode of the invention.

Turning next to FIG. 7 for an understanding of the random number mode of the invention, at block 90 the operator initiates this mode by wanding a random number bar code on a page of a book. This bar code indicates to the system the fact that the random number mode is to be implemented and certain additional information as will be discussed subsequently. The random number can be generated from either one of two differing distributions. In the first case the number is selected from a flat distribution wherein all elements of the distribution have the same probability of being selected. The number of elements in the distribution may range from one to some selected number identified by the bar code read in step 90, i.e. 50. In the other type of distribution, which may be referred to as the dice roll distribution, the random number generated is representative of the sum that is obtained when a plurality of dice are thrown. In the case of two dice for example it is well known that the probability that a seven will be obtained is considerably greater than the probability that a two will be obtained. Thus in this case the probability that any particular number in the distribution will be generated varies from number to number.

Returning to the flow diagram, therefore, at test 91 controller 14 determines whether the bar code has specified a flat distribution or not. If a flat distribution has been specified then at block 94 controller 14 determines the range of the distribution as determined by the number input at block 90. The random number is then generated at block 95 and at block 96 the synthesizer speaks the random number. Alternatively, if a flat distribution has not been specified by the bar code then the flow passes to block 92 where controller 14 determines the number of dice that are to be simulated, this number also being specified by the bar code read at step 90. The random number for the dice roll is then generated at block 93 and again is audibilized at block 96. In either case after the random number has been spoken at block 96 flow passes to block 97 where the system enters a wait state.

What is claimed is:

1. An electronic learning aid comprising:
   (a) a scanning means for selectively reading coded indicia, said coded indicia including first coded indicia corresponding to a random number generation command and a second coded indicia corresponding to a range command;
(b) a random number generating means connected to said scanning means for randomly selecting one of a specified set of numbers upon reading said coded indicia, the size of said set of numbers corresponding said range command;
(c) a response means connected to said random number generating means for selecting speech synthesis data corresponding to said selected number; and
(d) speech synthesis means connected to said response means for speaking one or more words of human language corresponding to said selected speech synthesis data.

2. An electronic learning aid as claimed in claim 1, wherein said speech synthesis data selected by said response means includes at least speech synthesis data corresponding to said selected number in human language.

3. An electronic learning aid as claimed in claim 1, wherein said scanning means includes optical reading means for reading a printed bar code.

4. An electronic learning aid comprising:
(a) a scanning means for selectively reading coded indicia, said coded indicia including first coded indicia corresponding to a random number command;
(b) a random number generating means connected to said scanning means for randomly selecting one of a pedetermined set of numbers upon reading of said first coded indicia corresponding to a random number command, the probability of selecting at least one of said numbers of said predetermined set different than the probability of selecting other numbers of said predetermined set;
(c) a response means connected to said random number generating means for selecting speech synthesis data corresponding to said selected number; and
(d) a speech synthesis means connected to said response means for speaking one or more words of human language corresponding to said selected speech synthesis data.

5. An electronic learning aid as claimed in claim 4, wherein said scanning means includes optical reading means for reading printed bar code.

6. An electronic learning aid as claimed in claim 4, wherein said response means further includes means for selecting numbers from said predetermined set having a probability distribution approximating the total number of spots in a throw of a predetermined plurality of dice.

7. An electronic learning aid as claimed in claim 6, wherein said response means further includes means for selecting numbers from said predetermined set having numbers 2 to 12 in a probability distribution approximating the total number spots in a throw of two dice.

* * * * *